Aug. 18, 1925.

A. A. HUTCHISON 1,550,615

FENDER BRACE

Filed July 28, 1923 2 Sheets-Sheet 1

A. A. Hutchison, INVENTOR

WITNESS: ATTORNEY

Aug. 18, 1925.

A. A. HUTCHISON 1,550,615

FENDER BRACE

Filed July 28, 1923     2 Sheets-Sheet 2

A. A. Hutchison, INVENTOR

BY Victor J. Evans

ATTORNEY

WITNESS:

Patented Aug. 18, 1925.

1,550,615

UNITED STATES PATENT OFFICE.

ARTHUR A. HUTCHISON, OF HOT SPRINGS, ARKANSAS.

FENDER BRACE.

Application filed July 28, 1923. Serial No. 654,423.

*To all whom it may concern:*

Be it known that I, ARTHUR A. HUTCHISON, a citizen of the United States, residing at Hot Springs, in the county of Garland and State of Arkansas, have invented new and useful Improvements in Fender Braces, of which the following is a specification.

The primary object of this invention is to provide a brace for supporting the fenders and radiator of the Ford type of automobile so as to make these parts rigid and prevent rattling of the fenders.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
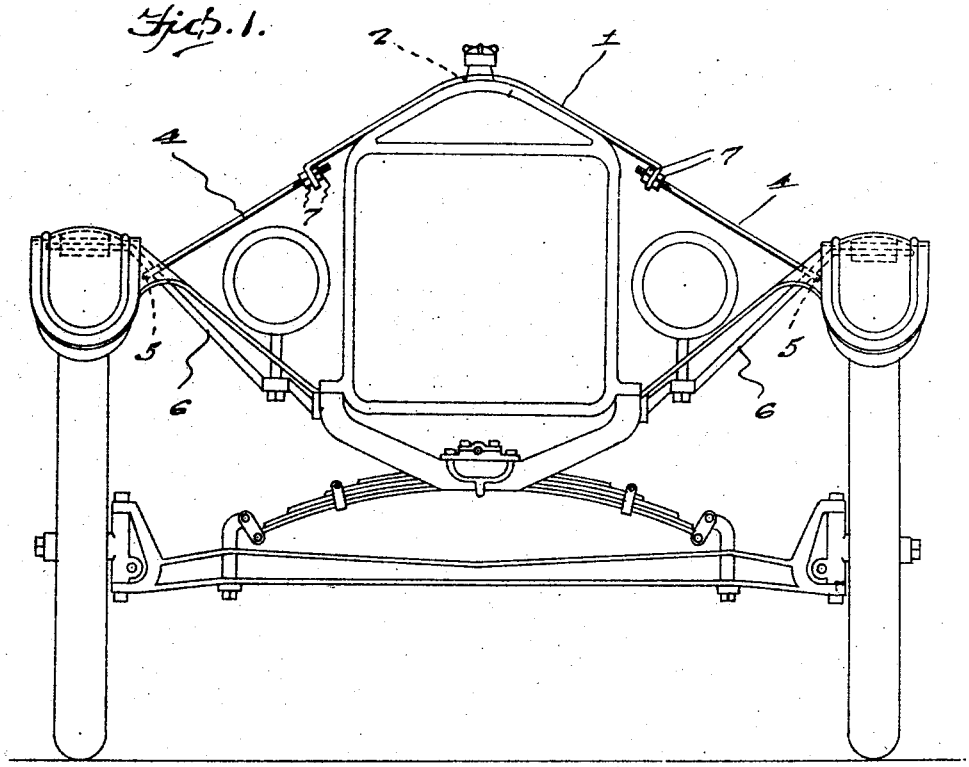
Figure 1 is a front view of an automobile showing my invention in use.
Figure 5:
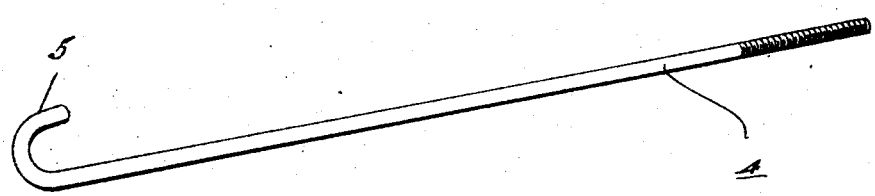
Figure 2:
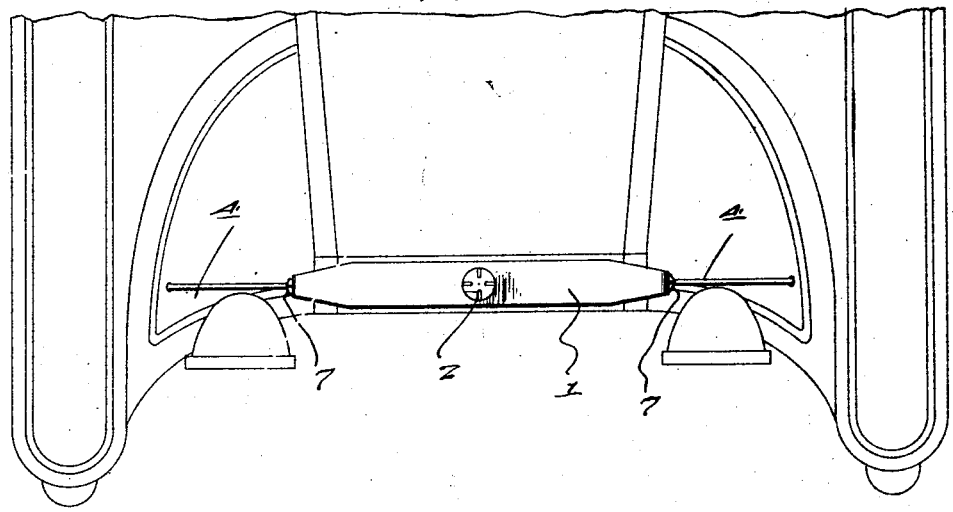
Figure 2 is a plan view.
Figure 3:
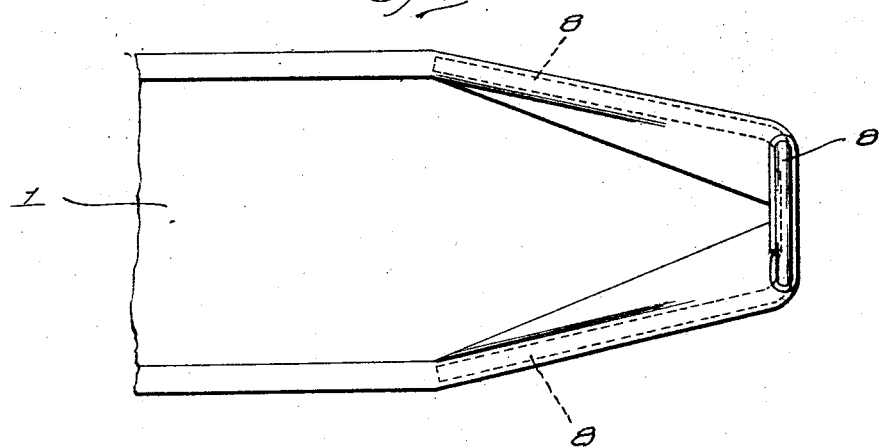
Figure 4:
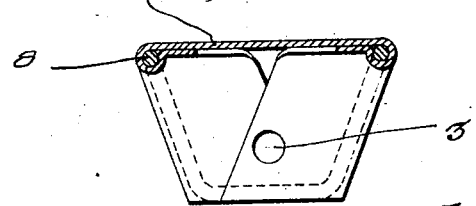

Figures 3, 4, and 5 are detail views.

As shown in these views the invention consists of a broad flat strip 1 which has an opening 2 in its center and has its ends bent and perforated, as at 3. The ends of the strip are tapered, as shown. Rods 4 have their hooked ends 5 engaging the fender brackets 6 and the threaded ends of these rods pass through the perforations in the bent ends, nuts 7 being placed on the threaded portions of the rods for holding the parts in rigid position, each rod having a pair of nuts thereon, one at each side of the bent end of the strip. The nuts are tightened until the fender is in proper position and then they are locked so that the fenders and radiator will be held rigid and rattling of the fenders will be prevented.

The strip 1 rests upon the top of the radiator and the filling spout of the radiator passes through the hole in the strip, the strip being bent to conform to the top of the radiator.

I prefer to form the ends of the strip 1 as shown in Figures 3 and 4 by folding the metal and placing a stiff wire 8 in the fold. This will make the ends of the strip of considerable strength and as the holes for the rods pass through the folded portion the walls of each hole will be of considerable thickness and thus increase the wearing qualities of the device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle, a brace comprising a curved strip engaging the top of the radiator of the vehicle and having a hole at its center for receiving the radiator spout, the ends of the strip being bent downwardly and perforated, a reinforcing member connected with each end of the strip and bent downwardly to brace the depending portion thereof, a pair of hooked rods having threaded ends, the hooks being adapted to engage the braces of the fenders of the vehicle and a pair of nuts on each rod for engaging the outer and inner faces of the bent ends of the strip for adjusting the rods in relation to the strip.

In testimony whereof I affix my signature.

ARTHUR A. HUTCHISON.